(12) United States Patent
Panzer et al.

(10) Patent No.: US 9,678,510 B2
(45) Date of Patent: Jun. 13, 2017

(54) ELECTROMAGNETIC ACTUATOR

(71) Applicant: Aktiebolaget SKF, Göteborg (SE)

(72) Inventors: Hans Peter Panzer, Lörrach (DE);
Christian Stehli, Basel (CH); Martin Voegelin, Hölstein (CH)

(73) Assignee: AKTIEBOLAGET SKF, Gothenburg (SE)

( * ) Notice: Subject to any disclaimer, the term of this patent is extended or adjusted under 35 U.S.C. 154(b) by 233 days.

(21) Appl. No.: 14/027,984

(22) Filed: Sep. 16, 2013

(65) Prior Publication Data

US 2014/0097780 A1  Apr. 10, 2014

(30) Foreign Application Priority Data

Sep. 14, 2012  (DE) .......................... 10 2012 216 366

(51) Int. Cl.
*G05D 3/10* (2006.01)
*H02P 3/00* (2006.01)

(52) U.S. Cl.
CPC ........ *G05D 3/10* (2013.01); *H02P 3/00* (2013.01)

(58) Field of Classification Search
CPC ...................................................... H02P 3/00
USPC ......................................... 318/445, 466, 468
See application file for complete search history.

(56) References Cited

U.S. PATENT DOCUMENTS

| | | | |
|---|---|---|---|
| 4,965,499 A * | 10/1990 | Taft ...................... | B23Q 35/128 219/124.34 |
| 5,204,605 A * | 4/1993 | Delattre et al. ............... | 318/721 |
| 7,026,770 B2 * | 4/2006 | Hemphill et al. ................. | 318/9 |
| 7,490,699 B2 * | 2/2009 | Gil et al. ....................... | 188/2 D |
| 7,705,551 B2 * | 4/2010 | Buerger et al. ........... | 318/400.37 |
| 7,808,196 B2 * | 10/2010 | Hartmann et al. ............ | 318/443 |
| 2006/0238152 A1 * | 10/2006 | Marioni ........................ | 318/268 |
| 2007/0046236 A1 * | 3/2007 | McMillan et al. ............ | 318/466 |
| 2010/0096155 A1 * | 4/2010 | Iwata et al. ................... | 173/176 |
| 2010/0315031 A1 * | 12/2010 | Jensen .......................... | 318/627 |
| 2013/0207584 A1 * | 8/2013 | Duits et al. ................... | 318/468 |

FOREIGN PATENT DOCUMENTS

WO  20110042472 A1  4/2011

* cited by examiner

*Primary Examiner* — Kawing Chan
(74) *Attorney, Agent, or Firm* — Bryan Peckjian; SKF USA Inc. Patent Dept.

(57) ABSTRACT

An electromechanical actuator includes a drive motor having rotatable drive shaft. A magnetic element is disposed on the drive shaft. A rotary-to-linear motion converter is driven by the rotatable drive shaft and includes a non-rotating actuator body that is linearly movable in a traveling direction. A Hall-effect sensor is disposed in a stationary manner proximal to the magnetic element disposed on the drive shaft. A controller is in electronic communication with the Hall-effect sensor. The controller counts the number of impulses output by the Hall-effect sensor when the drive shaft rotates relative to the Hall-effect sensor, and turns off the drive motor after a predetermined number of impulses have been counted since the start-up of the non-rotating actuator body. The controller may also count the number of times that the current of the drive motor exceeds a predetermined maximum value and store this counted value in a memory element.

13 Claims, 1 Drawing Sheet

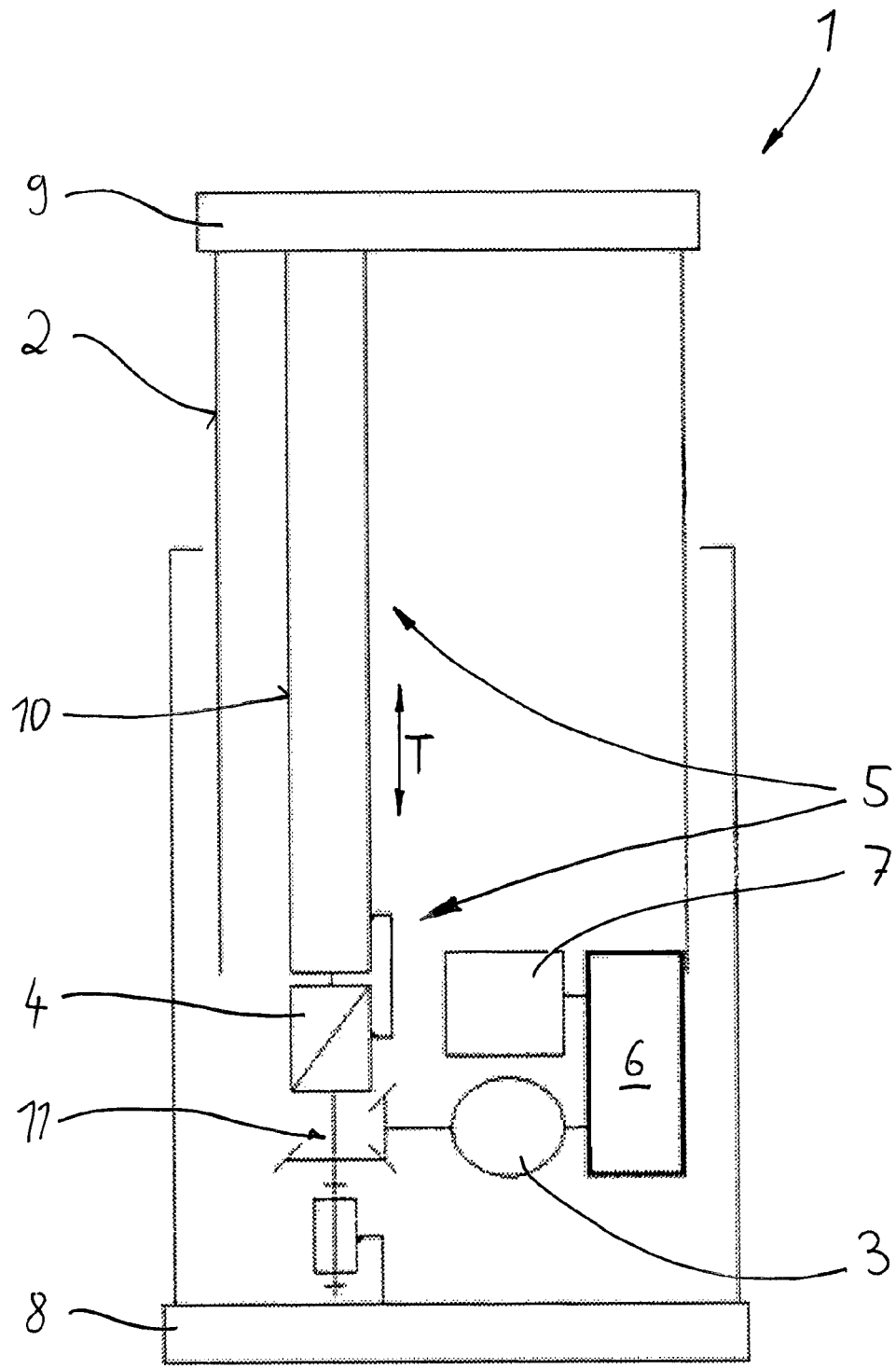

ELECTROMAGNETIC ACTUATOR

CROSS-REFERENCE

This application claims priority to German patent application no. 10 2012 216 366.2 filed on Sep. 14, 2012, the contents of which are fully incorporated herein by reference. The present application is entitled to claim priority under 35 U.S.C. 119 to this German patent application, because Sep. 14, 2013 is a Saturday and Sep. 16, 2013 is the first day thereafter that the US Patent & Trademark Office is open for business.

TECHNICAL FIELD

The present invention generally relates to an electromagnetic actuator having a rotary-to-linear motion converter and a travel range limiting device.

BACKGROUND ART

The electromagnetic actuator disclosed in WO 2011/042472 A1 includes a brushless electric motor, at least two digital Hall effect sensors for detecting the rotation of the rotary drive shaft of the electric motor, electronics for controlling the electric motor in an open-and/or closed-loop manner, and a mechanism for converting the rotation of the rotary drive shaft into linear movement of an adjusting element actuated by the actuator. The electric motor is disposed together with the sensors and the electronics in a common housing.

Such electromagnetic actuator may be utilized in a variety of fields of application to enable reciprocal linear (translational) movement of a machine component connected to a traveling means (e.g., a non-rotating body) of the actuator. In this way, the machine component can be linearly moved in a controlled manner between two defined end positions. So that the desired or necessary end positions of the linear movement are not exceeded, it is known to equip the actuator with end switches that stop the linear movement upon reaching the respective end positions.

However, such end switches involve electro-mechanical components that are disposed, e.g., on the movable traveling means. When the desired maximal traveling range (distance) has been reached, an electromechanical element placed at this location actuates the end switch as soon as it has reached the corresponding maximal position. Then, the current supply to the drive motor is interrupted so that the movement of the traveling means is halted.

In addition or in the alternative, mechanical stops can be mounted at the desired end positions of the traveling movement of the traveling means. In this case, when the traveling means reaches (abuts against) the stop, the current of the drive motor significantly increases. The motor current can be monitored by a controller so that the motor is turned off upon detecting an excessive motor current (i.e. when the motor current exceeds a predetermined threshold).

Such known devices are disadvantageous, because each requires special components to be able to set the defined traveling range limitations of the traveling means. Further, the range limiting means are subject to relatively high mechanical wear which reduces the service life of the actuator.

In addition, it is relatively costly to monitor such known actuators in order to determine when maintenance is required. Devices are known (e.g., "Alimo"—"Actuator Lifetime Monitoring" sold by AB SKF) that can be connected to the actuator in order to read out data concerning the operating time and the load cycles.

SUMMARY

Therefore, it is an object of the present teachings to disclose an electromechanical actuator that simplifies the monitoring to determine when maintenance is required.

According to one aspect of the present teachings, a controller configured to control the movement of the electromagnetic actuator is preferably configured to: count the number of drive cycles of the traveling means, measure the current of the drive motor and/or count the number of times that the current of the drive motor has exceeded a predetermined maximum value (threshold).

The controller preferably further includes a memory element configured to: store the number of counted drive cycles of the traveling means, the momentary value of the motor current and/or the number of times that the current of the drive motor has exceeded the predetermined maximum value (threshold).

In another aspect of the present teachings, the electromagnetic actuator preferably includes a rotary drive motor having a rotary drive shaft that includes an annular element. The annular element preferably includes at least one magnetized segment or at least one magnet. Furthermore, at least one Hall-effect sensor is preferably disposed proximal to the at least one magnetized segment or at least one magnet. In this case, the controller can be configured to count the number of impulses output by the Hall-effect sensor, and to turn off the drive motor during a traveling movement of the traveling means after a predetermined number of impulses have been counted since the start-up of the traveling means.

In another aspect of the present teachings, the electromagnetic actuator preferably includes a rotary-to-linear motion converter, which may be configured, e.g., as a spindle-nut-system. The rotary-to-linear motion converter is provided to convert rotational movement of the rotary drive shaft into a translational movement of the traveling means, which may be, e.g., a non-rotating actuator body.

In another aspect of the present teachings, the electromagnetic actuator may include a housing that comprises a base plate and a cover plate that are connected, at least in part, via a column-shaped connecting element. The column-shaped connecting element preferably serves as a housing of the rotary-to-linear motion converter.

In another aspect of the present teachings, the traveling means may comprise, e.g., the cover plate and the connecting element. The traveling means may be connected to a machine part or other device that is required to be moved in a linear or translational manner.

A traveling range limiting means for the traveling means preferably comprises the controller as well as a sensor system, e.g., one or more Hall-effect sensors.

In this case, an electronic traveling range limiting system for the translational movement of the traveling means is preferably integrated into the electromagnetic actuator. For example, the controller and the sensor system, i.e. the range limiting means, are preferably integrated into the actuator.

As a result, expensive and wear-prone mechanical end switches can be avoided. Further, it is possible to forgo special components that were necessary in previously-known embodiments to be able to set a specific traveling range. The manufacturing and assembly costs of the actuator can thus be reduced. Furthermore, a highly reliable system can be achieved, since it is possible to avoid the use of wear-prone components. Accordingly, the maintenance intervals can optionally be extended.

The proposed range limiting system requires no components that are dependent on the traveling path or length.

In another aspect of the present teachings, it is possible in a simple and advantageous way to detect and record the operating time, the traveling cycles, the drive current and/or the number of occurrences, in which the current of the drive motor exceeds a predetermined maximal value (threshold). This creates the possibility to make reliable predictions in a simple way, as to when maintenance of the actuator is required.

In a preferred embodiment of the present teachings, the number of occurrences (times), in which the current of the drive motor exceeds a predetermined maximal value/threshold (which is stored in the controller and/or in an appropriate memory element) is counted and stored. In this regard, it is useful to measure the momentary current of the drive motor and to compare it with a predetermined, i.e. stored value, which serves as a maximal permissible value for the motor current.

In such an embodiment, it is possible to detect/determine when and/or how often the maximal permissible value/threshold has been exceeded within a predetermined time interval and/or operating time frame. Each time the momentary motor current overshoots or exceeds the stored maximal permissible value is counted and stored. The predetermined maximal permissible value for the motor current is determined and/or selected in accordance with the momentary function of the actuator, wherein the up-and-down movement of the actuator, as well as the start- and braking characteristics and the safety status also can be determined.

It has been proven in a surprising manner that the detected number of overshoots of the maximal permissible current provides a good indicator for the (maintenance) condition of the system and/or for the necessity to service the actuator.

In another aspect of the present teachings, it is possible to achieve a desired start-up and braking of the traveling means (acceleration- and lag-ramps), in order to facilitate a soft start-up and braking. Thus, it is possible to ensure that the current has fewer peaks that could be damaging if they were to often occur.

Further objects, embodiments, advantages and designs of the present teachings will be explained in the following, or will become apparent, with the assistance of the exemplary embodiment and the appended FIGURE.

BRIEF DESCRIPTION OF THE DRAWING

The sole FIGURE shows a schematic drawing of a side view of an electromechanical actuator according to the present teachings.

DETAILED DESCRIPTION OF THE INVENTION

An actuator 1 according to the present teachings is shown in the FIGURE and comprises a housing 2, which is only schematically illustrated. The housing 2 is comprised, in essence, of two plates, i.e. a base plate 8 and a cover plate 9, which are connected to each other, at least in part, via a column-shaped connecting element 10. This connecting element 10 serves as an enclosure for a rotary-to-linear motion converting device 4 (hereinafter sometimes simply "converting device 4") in the form of a spindle-nut system.

This system comprises a traveling means 5, which undergoes a translational movement in the traveling direction T when the spindle rotates.

A (not shown) machine part can be affixed to the traveling means 5 in order to move it in the translational (linear) traveling direction T when the spindle of the spindle-nut-system is driven.

The spindle may be embodied, e.g., as a threaded spindle and/or a lead screw. The nut may be embodied, e.g., as a lead nut or a ball nut. The spindle and nut each have corresponding continuous helical threads that are meshed or engaged with each other. The nut is preferably non-rotatably affixed to (e.g., interlocked with) the traveling means, which is also not rotatable. Therefore, rotation of the spindle will cause the nut to travel up or down (move along) the length of the spindle (depending upon the rotational direction of the spindle), thereby linearly moving the traveling means. Such a device is known as a traveling-nut linear actuator.

The traveling means 5 may be exemplified, e.g., as a non-rotating actuator body that is linearly movable relative to a stationary base (i.e. the base plate 8).

A drive motor 3 rotatably drives the spindle (or lead screw) of the converting element 4 via a bevel gear 11.

So that the traveling means 5 travels only within a predetermined range in both directions T of the traveling path, range limiting means 6, 7 are provided and include a controller 6 and a sensor system 7 having at least one Hall-effect sensor.

An annular element is disposed on the rotating drive shaft of the drive motor 3 and rotates therewith. The annular element preferably includes one magnet at one circumferential position or two magnets at diametrically-opposite circumferential positions. It is sufficient that the annular element provides a discontinuous magnetic field such that the magnetic field (relative to a stationary point, e.g., where a Hall-effect sensor is mounted in a stationary manner) varies as the rotating drive shaft rotates.

At least one Hall-effect sensor 7 is disposed in a stationary manner adjacent (proximal) to the annular element. Therefore, when the drive shaft of the drive motor 3 rotates, a current or voltage (impulse) is generated in the Hall-effect sensor 7 according to the Hall-effect each time the magnet(s) pass(es) the Hall-effect sensor 7. The output of the Hall-effect sensor 7 is communicated to the controller 6 for processing.

For example, by counting the number of impulses output by the Hall-effect sensor 7, the controller 6 can precisely extrapolate the length of travel of the traveling means 5, since the displacement distance of the traveling means 5 in the traveling direction T can be precisely determined based upon the rotational angle of the drive shaft of the drive motor 3, the bevel gear 11 and the spindle-nut-system 4.

Therefore, after a predetermined number of (Hall) impulses (stored in a memory device of the controller 6) have been counted, i.e. when the traveling means 5 has reached the desired maximal travel position in one linear direction, the controller 6 can turn off the drive motor 3. Accordingly, a range limiting means 6, 7 is provided that is based purely on electric signals.

Consequently, the range limiting means 6, 7 do not require any mechanical parts that are prone to wear.

After the assembly of the actuator 1, the data necessary for the operation are loaded into the controller 6, in particular the desired maximal range of travel. A modification of the range of travel thus does not require any mechanical adjustment. Rather, it is only necessary to re-write the data stored in the controller 6.

As was mentioned above, a smoother start-up and stoppage of the traveling means 5 can be ensured by the controller 6, because the movement is controlled purely by software and not by mechanical components. Thus, sudden or abrupt (excessive) loads on the actuator and the attached components can be avoided.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved electromagnetic actuators, as well as methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Although some aspects of the present invention have been described in the context of a device, it is to be understood that these aspects also represent a description of a corresponding method, so that a block or a component of a device is also understood as a corresponding method step or as a feature of a method step. In an analogous manner, aspects which have been described in the context of or as a method step also represent a description of a corresponding block or detail or feature of a corresponding device.

Depending on certain implementation requirements, exemplary embodiments of the controller according to the present teachings may be implemented in hardware and/or in software. The memory element(s) can be implemented using a digital storage medium, for example a DVD, a Blu-Ray disc, a CD, a ROM, a PROM, an EPROM, an EEPROM or a flash memory, a hard drive or another magnetic or optical storage device, on which electronically readable control signals are stored, which interact or can interact with a programmable hardware component such that the respective method is performed.

The controller may include a programmable hardware component, which may include a processor, a computer processor (CPU=central processing unit), a graphics processor (GPU=graphics processing unit), a computer, a computer system, an application-specific integrated circuit (ASIC), an integrated circuit (IC), a system-on-a-chip (SOC), a programmable logic element, or a field programmable gate array (FGPA) including a microprocessor.

The digital storage medium can therefore be machine- or computer readable. Some exemplary embodiments may thus comprise a data carrier or non-transient computer readable medium which includes electronically readable control signals which are capable of interacting with a programmable computer system or a programmable hardware component such that one of the methods described herein is performed. An exemplary embodiment is thus a data carrier (or a digital storage medium or a non-transient computer-readable medium) on which the program for performing one of the methods described herein is recorded.

In general, exemplary embodiments of the present teachings may be implemented, at least in part, as a program, firmware, computer program, or computer program product including a program, or as data, wherein the program code or the data is operative to perform one of the methods if the program runs on a processor or a programmable hardware component. The program code or the data can for example also be stored on a machine-readable carrier or data carrier. The program code or the data can be, among other things, source code, machine code, bytecode or another intermediate code.

A program according to an exemplary embodiment can implement one of the methods during its performing, for example, such that the program reads storage locations or writes one or more data elements into these storage locations, wherein switching operations or other operations are induced in transistor structures, in amplifier structures, or in other electrical, optical, magnetic components, or components based on another functional principle. Correspondingly, data, values, sensor values, or other program information can be captured, determined, or measured by reading a storage location. By reading one or more storage locations, a program can therefore capture, determine or measure sizes, values, variable, and other information, as well as cause, induce, or perform an action by writing in one or more storage locations, as well as control other apparatuses, machines, and components, and thus for example also perform complex processes using actuators.

REFERENCE NUMBER LIST

1 Actuator
2 Housing
3 Drive motor
4 Converter element (transmission element)
5 Traveling means
6, 7 Range limiting means
6 Controller
7 Sensor system
8 Base plate
9 Cover plate
10 Connecting element
11 Bevel gear
T Translational traveling direction

The invention claimed is:

1. An electromechanical actuator comprising:
a housing,
a drive motor disposed in or on the housing and including a rotatable drive shaft,
an annular element disposed on a rotatable drive shaft of the drive motor,
a rotary-to-linear motion converter driven by the drive motor and comprising a movable traveling means that is movable in a translational direction, and
range limiting means disposed in the electromechanical actuator for controlling the drive motor by turning off the drive motor when the traveling means has reached a desired maximal travel position, wherein the range limiting means is formed as a contactless electronic switching device and comprises a controller and at least one Hall-effect sensor in electronic communication with the controller, wherein the range limiting means utilizes electric impulses of the at least one Hall-effect sensor to avoid utilizing mechanical parts that are prone to wear when measuring a length of travel of the traveling means, wherein the controller is configured to count a number of drive cycles of the traveling means and measure a current of the drive motor, wherein the controller comprises a memory element configured to store the number of drive cycles of the traveling means and a momentary value of the current of the drive motor, wherein the annular element includes two magnets at diametrically-opposite circumferential positions to provide a discontinuous magnetic field that varies as the rotating drive shaft rotates, wherein the at least one Hall-effect sensor is disposed proximal to the two magnets, wherein the controller counts a number of the electric impulses outputted by the at least one Hall-effect sensor in accordance with the discontinuous magnetic field provided by the wo magnets to extrapolate the length of travel of the traveling means during a traveling movement in the translational direction, wherein the controller, during the traveling movement, turns off the drive motor after a predetermined number of the electric impulses has been counted since a start-up of the traveling means and after the number of electric impulses indicates that the traveling means has reached the desired maximal travel position in a linear direction of the traveling movement.

2. The electromechanical actuator according to claim 1, wherein the rotary-to-linear motion converter comprises a spindle and a nut.

3. The electromechanical actuator according to claim 2, wherein the housing comprises a base plate and a cover plate that are connected, at least in part, via a column-shaped connecting element.

4. The electromechanical actuator according to claim 3, wherein the column-shaped connecting element is a housing of the rotary-to-linear motion converter.

5. The electromechanical actuator according to claim 1, wherein the rotary-to-linear motion converter comprises a spindle and a nut.

6. The electromechanical actuator according to claim 1, wherein the housing comprises a base plate and a cover plate that are connected, at least in part, via a column-shaped connecting element.

7. The electromechanical actuator according to claim 6, wherein the column-shaped connecting element is a housing of the rotary-to-linear motion converter.

8. The electromechanical actuator according to claim 1, wherein a displacement distance of the traveling means in the traveling direction is determined by the range limiting means based upon a rotational angle of a drive shaft of the drive motor, a bevel gear and a spindle-nut-system.

9. The electromechanical actuator according to claim 1, wherein the controller is configured to load data on the memory element.

10. The electromechanical actuator according to claim 1, wherein the controller is configured to start and stop the traveling means based on the electrical signals.

11. An electromechanical actuator comprising:
a housing,
a drive motor disposed in or on the housing and including a rotatable drive shaft,
an annular element disposed on a rotatable drive shaft of the drive motor,
wherein the annular element includes two magnets at diametrically-opposite circumferential positions to provide a discontinuous magnetic field that varies as the rotating drive shaft rotates,
a rotary-to-linear motion converter configured to be driven by the rotatable drive shaft, the rotary-to-linear motion converter comprising a non-rotating actuator body that is linearly movable in a traveling direction,
at least one Hall-effect sensor disposed in a stationary manner proximal to the two magnets, and
a controller in electronic communication with the at least one Hall-effect sensor,
wherein the controller utilizes electric impulses of the at least one Hall-effect sensor to avoid utilizing mechanical parts that are prone to wear when measuring a length of travel of the non-rotating actuator body in a translational direction,
wherein the controller is configured to:
control the drive motor by turning off the drive motor when the non-rotating actuator body reached a desired maximal travel position,
count a number of the electric impulses outputted by the at least one Hall-effect sensor when the drive shaft rotates relative to the at least one Hall-effect sensor in accordance with the discontinuous magnetic field provided by the wo magnets to extrapolate the length of travel of the non-rotating actuator body during a traveling movement in the translational direction, and
turn off the drive motor after the number of the electric impulses indicates that the non-rotating actuator body has reached the desired maximal travel position in a linear direction of the traveling movement since a start-up of the non-rotating actuator body.

12. The electromechanical actuator according to claim 11, wherein the controller is further configured to measure a current of the drive motor and a momentary value of a motor current of the drive motor, and
the controller comprises a memory element configured to store the momentary value of the current of the drive motor.

13. An electromechanical actuator comprising:
a housing,
a drive motor disposed in or on the housing and comprising a rotatable drive shaft,
an annular element disposed on a rotatable drive shaft of the drive motor,
wherein the annular element includes two magnets at diametrically-opposite circumferential positions to provide a discontinuous magnetic field that varies as the rotating drive shaft rotates,
a rotary-to-linear motion converter configured to be driven by the rotatable drive shaft, the rotary-to-linear motion converter comprising a non-rotating actuator body that is linearly movable in a traveling direction,
a controller that utilizes electric impulses of at least one Hall-effect sensor, disposed proximal to the two magnets, to avoid utilizing mechanical parts that are prone to wear when measuring a length of travel of the non-rotating actuator body in a translational direction,
the controller configured to:

control the drive motor by turning off the drive motor when the non-rotating actuator body reached a desired maximal travel position, count a number of the electric impulses outputted by the at least one Hall-effect sensor when the drive shaft rotates relative to the at least one Hall-effect sensor in accordance with the discontinuous magnetic field provided by the wo magnets to extrapolate the length of travel of the non-rotating actuator body during a traveling movement in the translational direction, and turn off the drive motor via the electric signal the number of electric impulses indicates that the non-rotating actuator body has reached a desired maximal travel position in a linear direction of the traveling movement since a start-up of the non-rotating actuator body, and a memory element configured to store the desired maximal travel position.

* * * * *